United States Patent
Wu et al.

(10) Patent No.: US 11,075,989 B2
(45) Date of Patent: *Jul. 27, 2021

(54) CELLULAR NETWORK HIERARCHICAL OPERATIONAL DATA STORAGE

(71) Applicants: AT&T Intellectual Property I, L.P., Atlanta, GA (US); AT&T Mobility II LLC, Atlanta, GA (US)

(72) Inventors: Xidong Wu, San Ramon, CA (US); Mark Brady, Stanford, CA (US); Mario Kosseifi, Roswell, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/664,890

(22) Filed: Oct. 27, 2019

(65) Prior Publication Data

US 2020/0059518 A1 Feb. 20, 2020

(51) Int. Cl.
*H04L 29/08* (2006.01)
*H04M 15/00* (2006.01)

(52) U.S. Cl.
CPC .......... *H04L 67/1097* (2013.01); *H04L 67/32* (2013.01); *H04M 15/41* (2013.01)

(58) Field of Classification Search
CPC ...... H04L 67/1097; H04L 67/32; H04L 47/70
See application file for complete search history.

(56) References Cited

U.S. PATENT DOCUMENTS

| | | | |
|---|---|---|---|
| 6,535,866 | B1 | 3/2003 | Iwadate |
| 7,197,507 | B2 | 3/2007 | Sugiura |

(Continued)

FOREIGN PATENT DOCUMENTS

| | | |
|---|---|---|
| KR | 20040041321 | 5/2004 |
| WO | WO 01/98857 | 12/2001 |

(Continued)

OTHER PUBLICATIONS

Kalmanek, Charles R., et al. "Darkstar: Using exploratory data mining to raise the bar on network reliability and performance." Design of Reliable Communication Networks, 2009, DRCN 2009, 7th International Workshop, IEEE, 2009. https://www.cs.utah.edu/~kobus/docs/darkstar.drcn.pdf.

Tierney, Brian, et al. "A monitoring sensor management system for grid environments." Cluster Computing 4.1 (2001): 19-28. http://escholarship.org/uc/item/9wk292xg.pdf.

(Continued)

*Primary Examiner* — Brian Whipple
*Assistant Examiner* — James Ross Hollister

(57) ABSTRACT

A system may include a first processor for storing, in a key-value column-based database, data records from data sources of a cellular network that is transformed into a single format. Customer identifiers may be used as key-values for indexing the data records in the key-value column-based database. The system may include a second processor for creating session records from the data records. Each session record may include a velocity of an endpoint device associated with a session and a number of inter-cell handoff attempts for the session. Each session record may also be labeled with a session identifier comprising a customer identifier and a timestamp. The system may further include a third processor for creating cell-level records from the session records. Each cell-level record may include a plurality of key performance indicators for a cell site of the cellular network segregated by a plurality of endpoint device types.

20 Claims, 5 Drawing Sheets

(56) References Cited

U.S. PATENT DOCUMENTS

| | | | |
|---|---|---|---|
| 7,466,672 | B2 | 12/2008 | Van Der Burg et al. |
| 7,809,826 | B1 | 10/2010 | Guruswamy |
| 7,921,202 | B2 | 4/2011 | Bui et al. |
| 7,941,384 | B2 | 5/2011 | Gilman |
| 7,974,387 | B2 | 7/2011 | Lutz et al. |
| 8,103,763 | B2 | 1/2012 | Slepov et al. |
| 8,577,329 | B2 | 11/2013 | Momtahan et al. |
| 9,015,312 | B2 | 4/2015 | Magyar et al. |
| 9,384,112 | B2 | 7/2016 | Petersen et al. |
| 9,432,865 | B1* | 8/2016 | Jadunandan .......... H04L 41/069 |
| 2008/0009297 | A1* | 1/2008 | Lotvonen .............. H04W 64/00 455/456.6 |
| 2009/0299830 | A1 | 12/2009 | West et al. |
| 2010/0027431 | A1* | 2/2010 | Morrison ............ H04L 41/0681 370/252 |
| 2011/0065439 | A1* | 3/2011 | Vargantwar ........... H04W 36/32 455/437 |
| 2012/0144384 | A1 | 6/2012 | Baek |
| 2012/0264447 | A1* | 10/2012 | Rieger, III ............ H04W 4/025 455/456.1 |
| 2013/0188496 | A1* | 7/2013 | Hong .................... H04W 24/00 370/241 |
| 2014/0040292 | A1 | 2/2014 | Basak et al. |
| 2014/0323080 | A1* | 10/2014 | Mishkin ................. H04W 4/38 455/405 |
| 2015/0033294 | A1 | 1/2015 | Fevrier |
| 2015/0373501 | A1* | 12/2015 | Dribinski .............. H04W 4/029 455/456.1 |
| 2015/0382209 | A1 | 12/2015 | Sanneck et al. |
| 2016/0253220 | A1 | 9/2016 | Cai et al. |
| 2016/0286410 | A1* | 9/2016 | O'Malley ............. H04W 24/02 |
| 2017/0078171 | A1* | 3/2017 | Tapia ..................... H04L 65/80 |

FOREIGN PATENT DOCUMENTS

| | | |
|---|---|---|
| WO | WO 2015/138706 | 9/2015 |
| WO | WO 2015/176117 | 11/2015 |
| WO | WO 2016/060595 | 4/2016 |
| WO | WO 2016/127182 | 8/2016 |

OTHER PUBLICATIONS

Wolfson, Ouri, Soumitra Sengupta, and Yechiam Yemini. "Managing communication networks by monitoring databases." IEEE Transactions on Software Engineering 17.9 (1991): 944-953. https://www.researchgate.net/profile/Yechiann_Yennini/publication/3187409_Managing_communication_networks_by_monitoring_databases/links/00b495329c48cd72a7000000.pdf.

Moore, Justin, et al. "Data center workload monitoring, analysis, and emulation." Eighth Workshop on Computer Architecture Evaluation using Commercial Workloads, 2005. http://seelab.ucsd.edu/virtualefficiency/related_papers/42_caecw05.pdf.

Long, Darrell DE, et al. "REINAS: the real-time environmental information network and analysis system." Compcon'95. 'Technologies for the Information Superhighway', Digest of Papers, IEEE, 1995. https://www.researchgate.net/profile/Darrell_Long2/publication/3646692_REINAS_the_Real-time_Environnmental_Information_Network_and_Analysis_System/links/09e415060772cce35b000000.pdf.

Chen, Yanpei, Sara Alspaugh, and Randy Katz. "Interactive analytical processing in big data systems: A cross-industry study of mapreduce workloads." Proceedings of the VLDB Endowment 5.12 (2012): 1802-1813. http://arxiv.org/pdf/1208.4174.pdf.

* cited by examiner

CELLULAR NETWORK HIERARCHICAL OPERATIONAL DATA STORAGE

This application is a continuation of U.S. patent application Ser. No. 15/267,420, filed Sep. 16, 2016, now U.S. Pat. No. 10,462,220, which is herein incorporated by reference in its entirety.

The present disclosure relates generally to the collection and storage of operational data, e.g., within a cellular network, and more particular to systems, computer-readable media, and methods for creating session records and cell-level records of a cellular network.

BACKGROUND

Telecommunication networks may generate and collect a large volume of control plane data. For example, call detail records (CDRs) are records produced by network elements which contain details of a call (including voice calls, data calls, e.g., emails, Internet Protocol (IP) traffic, short message service (SMS) messages, and so forth) that pass through such network elements. CDRs and cause codes may conform to an industry standard format. For example, each CDR may comprise numerous fields containing different information or parameters. To name only a few parameters for illustration, CDR parameters may comprise a cause code, a calling party area code, a calling party phone number, a called party area code, a called party phone number, a date of a call, a time stamp for the start of a call, a time stamp for the end of a call, a time duration of a call, a type of call, a disposition of a call, and so forth. The generation, collection, and storage of CDRs and other control plane data may require significant network resources beyond those resources that are utilized to convey actual user traffic. In addition, big data approaches to storage and network analytics may lack real-time capabilities, e.g., due to the sheer volume of data. Such approaches may also lack scalability, e.g., as a result of being customized for specific applications. Virtualization of core telecommunication network components also opens up numerous connectivity paths between domains that did not exist for a traditional "physical" network, thereby further increasing the complexity of network management.

SUMMARY

In one example, the present disclosure discloses a system, computer-readable medium, and method for creating session records and cell-level records of a cellular network. For example, a system may include a first processor for storing, in a key-value column-based database, data records from data sources of a cellular network, the data records transformed into a single format. Customer identifiers may be used as key-values for indexing the data records in the key-value column-based database. The system may include a second processor for creating session records from the data records. Each session record may include a velocity of an endpoint device associated with a session and a number of inter-cell handoff attempts for the session. Each session record may also be labeled with a session identifier comprising a customer identifier and a timestamp. The system may further include a third processor for creating cell-level records from the session records. Each cell-level record may include a plurality of key performance indicators for a cell site of the cellular network segregated by a plurality of endpoint device types.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
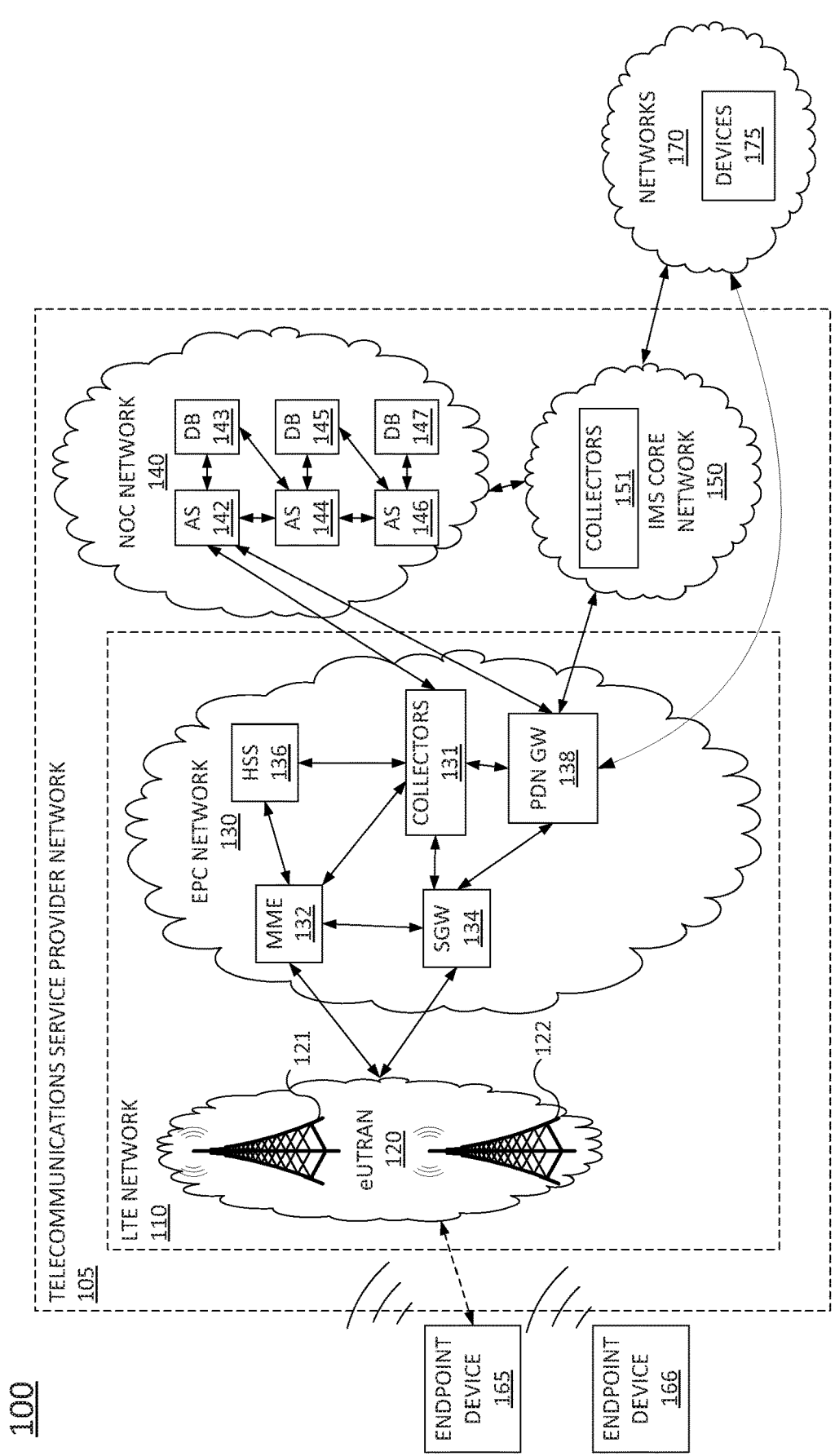
FIG. 1 illustrates an example system related to the present disclosure.

The present disclosure broadly discloses systems, computer-readable media, and methods for creating session records and cell-level records of a cellular network. For example, a cellular network may provide services for millions of customers. In addition, many petabytes of data are collected each year from every layer and segment of the network. For instance, the cellular network operator may collect and store operational data, such as: control plane signaling and/or session management messages, call detail records (CDRs), error reports, performance logs of various network components, including switches, gateways, base station equipment, user equipment, and so forth. However, these large amounts of stored operational data may remain underutilized. For instance, using commercially available large server technologies or grid computing platforms, many terabytes per day may be gathered, but the operational data may be accessed infrequently, either requiring too much specific expertise, or incurring too great a cost for specialized hardware infrastructure. Newer open source and distributed computing technologies running on low cost commodity hardware may be used to reduce the cost in processing many terabytes of data per day and to reduce the requisite level of personnel skill to access and manipulate the operational data. However, general purpose "big data" platforms are not specific for cellular network operational data processing. For a cellular network operator, there are various domain specific and diverse operational data processing tasks where it is desirable to process cellular network operational data in ways which are very different from general big data processing. Therefore, just using a general purpose big data platform may be inefficient, e.g., in terms of processing speed or the amount of hardware utilized, or may incur unnecessarily high costs, e.g., in terms of excess equipment or in terms of the amount of personnel time and effort to make the general purpose big data platform perform as desired for cellular network operational data processing.

In accordance with the present disclosure, a system is provided that is tailored to the ways in which operational data is utilized in cellular network. Compared with other frameworks, the present system achieves greater process clarity, reduces complexity and better meets the utilization patterns of a cellular network operator. Cellular network operations include many personnel and groups at different levels which are responsible for different aspects of network/service management and business management. The operational data that is collected may be stored and used for various purposes, including network troubleshooting/monitoring, network optimization, network planning, network capacity management, marketing, sales, business strategy, claims, etc. Typically, network engineers and technicians prefer detailed data for network troubleshooting. However, network planning personnel generally do not need to analyze message level or per-customer level information. Instead, network planning personnel may be better served by higher level aggregated data, such as summaries for switches or cell sites. In addition, marketing and sales people typically consult regional level data summaries.

In one example, the present disclosure provides for a hierarchy of stages of operational data processing, from a lowest level, at a point of raw operational data ingestion, to intermediate levels, where operational data is aggregated from various data sources (network elements, management systems, operating support systems, network probes, etc.) e.g., on a per session and/or a per cell site basis, to a highest level of aggregation, e.g., on a per market or per region basis. At each stage, the operational data is fed into storage systems for present or later usage or sent to a higher stage, or level, for further processing and higher-level aggregation. A loosely coupled interface is defined between different stages/levels so that any change in processing at one level does not affect the processing at another level. Data storage formats for aggregated data output are defined at each level of processing based on the data sizes and user usage patterns. The operational data gathered and stored at the lowest level (control plane messages, traces, original measurements, etc.) may amount to many terabytes per day. However, in accordance with the present disclosure the volume of data aggregated and stored for higher levels (e.g., for marketing and sales) is considerably lower. These and other aspects of the present disclosure are discussed in greater detail below in connection with the examples of FIGS. 1-5.

To better understand the present disclosure, FIG. 1 illustrates an example network, or system 100 that may implement examples of the present disclosure for creating session records and cell-level records of a cellular network. In one example, the system 100 includes a telecommunications service provider network 105, e.g., a cellular network. The telecommunications service provider network 105 may comprise a Long Term Evolution (LTE) network 110, a network operations center (NOC) network 140, and a core network, e.g., an IP Multimedia Subsystem (IMS) core network 150. The system 100 may further include other networks 170 connected to the telecommunications service provider network 105. As shown in FIG. 1, the system 100 may connect endpoint devices 165 and 166 with devices 175 in networks 170, with other endpoint devices (not shown) and/or with other components of telecommunication service provider network 105. The endpoint devices 165 and 166 may each comprise a cellular telephone, a smartphone, a tablet computing device, a laptop computer, a pair of computing glasses, a wireless enabled wristwatch, or any other wireless and/or cellular-capable mobile telephony and computing device (broadly, a "mobile endpoint device").

In one example, the LTE network 110 comprises an access network and a core network. For example, as illustrated in FIG. 1, LTE network 110 may comprise an evolved Universal Terrestrial Radio Access Network (eUTRAN) 120 and an evolved packet core (EPC) network 130. The eUTRANs are the air interfaces of the 3rd Generation Partnership Project (3GPP) LTE specifications for mobile networks. In one example, EPC network 130 provides various functions that support wireless services in the LTE environment. In one example, EPC network 130 is an Internet Protocol (IP) packet core network that supports both real-time and non-real-time service delivery across a LTE network, e.g., as specified by the 3GPP standards. In one example, all eNodeBs, e.g., including eNodeBs 121 and 122 in the eUTRAN 120, are in communication with the EPC network 130. In operation, LTE user equipment or user endpoints (UE), such as endpoint devices 165 and 166, may access wireless services via the eNodeBs 121 and 122 located in eUTRAN 120. It should be noted that any number of eNodeBs can be deployed in an eUTRAN.

In EPC network 130, network devices Mobility Management Entity (MME) 132 and Serving Gateway (SGW) 134 support various functions as part of the LTE network 110. For example, MME 132 is the control node for the LTE access networks, e.g., including eUTRAN 120. In one embodiment, MME 132 is responsible for user equipment tracking and paging (e.g., such as retransmissions), bearer activation and deactivation process, selection of the SGW, e.g., SGW 134, and user authentication. In one embodiment, SGW 134 routes and forwards user data packets, while also acting as the mobility anchor for the user plane during inter-eNodeB handoffs and as the anchor for mobility between LTE and other wireless technologies, such as 2G and 3G wireless networks.

In addition, EPC (common backbone) network 130 may comprise a Home Subscriber Server (HSS) 136 that contains subscription-related information (e.g., subscriber profiles), performs authentication and authorization of a wireless service user, and provides information about the subscriber's location. The EPC network 130 may also comprise a packet data network (PDN) gateway 138 which serves as a gateway that provides access between the EPC network 130 and various data networks, e.g., NOC network 140, IMS core network 150, networks 170, and the like. The packet data network gateway 138 is also referred to as a PDN gateway, a PDN GW or a PGW.

In one example, networks 170 may represent one or more enterprise networks, a circuit switched network (e.g., a public switched telephone network (PSTN)), a cable network, a digital subscriber line (DSL) network, a metropolitan area network (MAN), an Internet service provider (ISP) network, a network of a different cellular service provider, and the like. In one example, the other networks 170 may include different types of networks. In another example, the other networks 170 may be the same type of network. Devices 175 may include endpoint devices, such as personal computers, desktop computers, laptop computers, personal digital assistants (PDAs), tablet computing devices, circuit-switched or packet communications-based telephones, or the like. Devices 175 may also include servers, switches, gateways, routers, base stations, storage devices, and any other wireless and/or wired communication enabled computing device. In one example, endpoint devices 165 and 166 may be connected to one of devices 175 via PDN GW 138, and/or via PDN GW 138 and IMS core network 150.

In one example, NOC network 140 may comprise a network that may be used by personnel of the telecommunications service provider network 105 to perform various tasks relating to the operations, administration, and management (OAM) of the telecommunications service provider network 105. As such, NOC network 140 may represent aspects of telecommunications service provider network 105 where infrastructure for supporting such services may be deployed. In the example of FIG. 1, NOC network 140 may include several application servers, e.g., AS 142, AS 144, and AS 146. In one example, AS 142, AS 144, and AS 146 may each comprise a computing system, such as computing system 500 depicted in FIG. 5, specifically configured to perform various steps, functions, and/or operations for creating session records and cell-level records of a cellular network, in accordance with the present disclosure. It should be noted that as used herein, the terms "configured" and "reconfigured" may refer to programming or loading a computing device with computer-readable/computer-executable instructions, code, and/or programs, e.g., in a memory, which when executed by a processor of the computing device, may cause the computing device to perform various functions. In one example, NOC network 140 may also include several databases DB 143, DB 145, and DB 147, e.g., physical storage devices integrated with, attached or coupled to AS 142, AS 144, and AS 146, respectively. In one example, DB 143, DB 145, and/or DB 147 may be spread across various physical storage devices in a single location or in multiple different locations. The relationships between AS 142, AS 144, and AS 146, and DB 143, DB 145, and DB 147 are described in greater detail below.

In one example, system 100 may include one or more collectors 131 in EPC network 130. In one example, collectors 131 may each comprise a computing system, such as computing system 500 depicted in FIG. 5, configured to collect operational data (broadly "data records") from various data sources within the telecommunication service provider network 105 and to forward the operational data to AS 142. For instance, collectors 131 may include network probes to gather operational data from various components within EPC network 130 and/or eUTRAN 120, and/or to perform other operations in accordance with the present disclosure. For example, collectors 131 may interface with various elements within EPC network 130 and/or eUTRAN 120, such as MME 132, SGW 134, HSS 136, PDN GW 138, eNodeBs 121 and 122, etc., to collect operational data, such as: control plane signaling and/or session management messages, CDRs, error reports, performance logs, and so forth, which may then be compiled and sent to AS 142 for normalization/transformation, tagging, storage/archiving, and forwarding to AS 144.

The control plane signaling and/or session management messages may relate to communications traversing EPC network 130 for endpoint devices 165 and 166 or for other endpoint devices/UEs, internal communications between components within EPC network 130, communications from external devices, such as one of devices 175 to components within EPC network 130, and so forth. The CDRs may be collected from a billing system (not shown) and may include various fields, such as: a cause code, a calling party area code, a calling party phone number, a called party area code, a called party phone number, a date of a call, a time stamp for the start of a call, a time stamp for the end of a call, a time duration of a call, a type of call, a disposition of a call, and so forth. Error reports and performance logs may include records that indicate statuses of various aspects of different components, such as statuses of ports or interfaces, processor or memory utilization levels, link utilization levels, call logs that indicated completed calls, dropped calls, etc., notifications from a network element to other network elements regarding various issues, such as an overload condition, a power source failure, an impending power off event, and so on.

In one example, IMS core network 150 may also include collectors 151 which may have similar configurations and perform similar functions to collectors 131, albeit with respect to components of IMS core network 150, such as a proxy call session control function (P-CSCF), a serving call session control function (S-CSCF), a billing and traffic (B&T) server, an ENUM (tElephone NUmbering Mapping) server, a domain name service (DNS) server, and other components (not shown). For example, collectors 151 may collect operational data from components of IMS core network 150 and forward the operational data to AS 142.

As noted above, AS 142 may receive operational data from collectors 131 and/or collectors 151, whereupon AS 142 may then perform various operations in accordance with the present disclosure to process the incoming operational data. For example, AS 142 may transform the operational data/data records that may be received in various native formats into a single format, e.g., a text-based format such as comma separated values (CSV), and may tag the data records that are transformed into the single format with record identifiers which uniquely identify each data record. In one example, AS 142 may store the data records that are transformed and tagged into DB 143. In one example, DB 143 may comprise a key-value column-based database and may be distributed over one or more physical storage devices. In addition, in one example, customer identifiers (IDs), such as a mobile subscription identification number (MSIN), an international mobile subscriber identity (IMSI), or an international mobile equipment identity (IMEI), may be used as key-values for indexing the plurality of data records in the key-value column-based (distributed) database system. For example, DB 143 may comprise an HBase™ database that may be accessed using tools such as Pig™, Hive™, Spark™, MapReduce, etc. AS 142 may also provide the data records that are transformed and tagged, or copies of such data records to AS 144 for further processing in accordance with the present disclosure. Alternatively, or in addition, AS 144 may access DB 143 to retrieve the data records stored therein, e.g., using the access tools described above.

In accordance with the present disclosure, AS 144 may create session records from the data records that are transformed into the single format. For instance, AS 144 may retrieve data records from DB 143 relating to a given endpoint device, or customer, by using a customer ID as a key to the data records pertaining to the endpoint device. In one example, AS 144 may then group the data records by session and derive various types of information for the session, which AS 144 may then populate into a session record. In one example, the start of a session is identified by a data record relating to a first message sent out to set up the session, while the end of the session is identified by a data record relating to a second message sent to indicate that the endpoint device wants to disconnect, another data record indicating a dropped call or other abnormal termination, a data record relating to a message from another device that was party to the session indicating that the session should be torn down, and so forth. The data records associated with the customer ID and with time stamps between the start and the end of the session are then aggregated. If an endpoint device of a user is in motion, e.g., in a moving vehicle, this could include data records from multiple cells, and involve handoffs between multiple eNodeBs, handoffs from 4G to 3G, etc. Thus, information from the various data records are processed into a session record. While there is a significant reduction in storage volume, e.g., an 80-90 percent reduction, most of the useful information (e.g., 80-90 percent or more) for technicians and radio access network (RAN) engineers is retained.

In one example, each of the session records includes a velocity of an endpoint device associated with a session and a number of inter-cell handoff attempts for the session. For example, the velocity may be determined by AS 144 from data records that include distance values representing distances of the endpoint device to the cell site and data records that include bearing values representing bearings of the endpoint device with respect to the cell site. Similarly, the number of inter-cell handoffs may be calculated by counting data records indicative of an inter-cell handoff. In one example, a session record may include sub-records for attempted, successful and/or unsuccessful inter-cell handoffs for the session. For example, sub-records for successful inter-cell handoffs for a session may include an identifier of a first cell site associated with the session, an identifier of an second cell site from which the session is transferred to the first cell site or to which the session is transferred from the first cell site, and a cause code that identifies a reason for the successful inter-cell handoff.

In one example, a session record may include sub-records comprising radio conditions at a plurality of time intervals during the session. For example, radio conditions may be reported by an endpoint device to an eNodeB during the session, whereupon the reported radio conditions may comprise operational data that is captured in a data record that is received by AS 142, and which may be aggregated by AS 144 into the session record for the session. In addition, in one example each of the plurality of session records is labeled with a session identifier comprising a customer ID and a timestamp. The customer ID may be the same customer ID mentioned above, e.g., an MSIN, IMSI, IMEI, etc., and may relate to the endpoint device of the customer that is involved in the session. In one example, the timestamp for the session record may comprise the timestamp of the first data record relating to the session setup.

Figure 2:
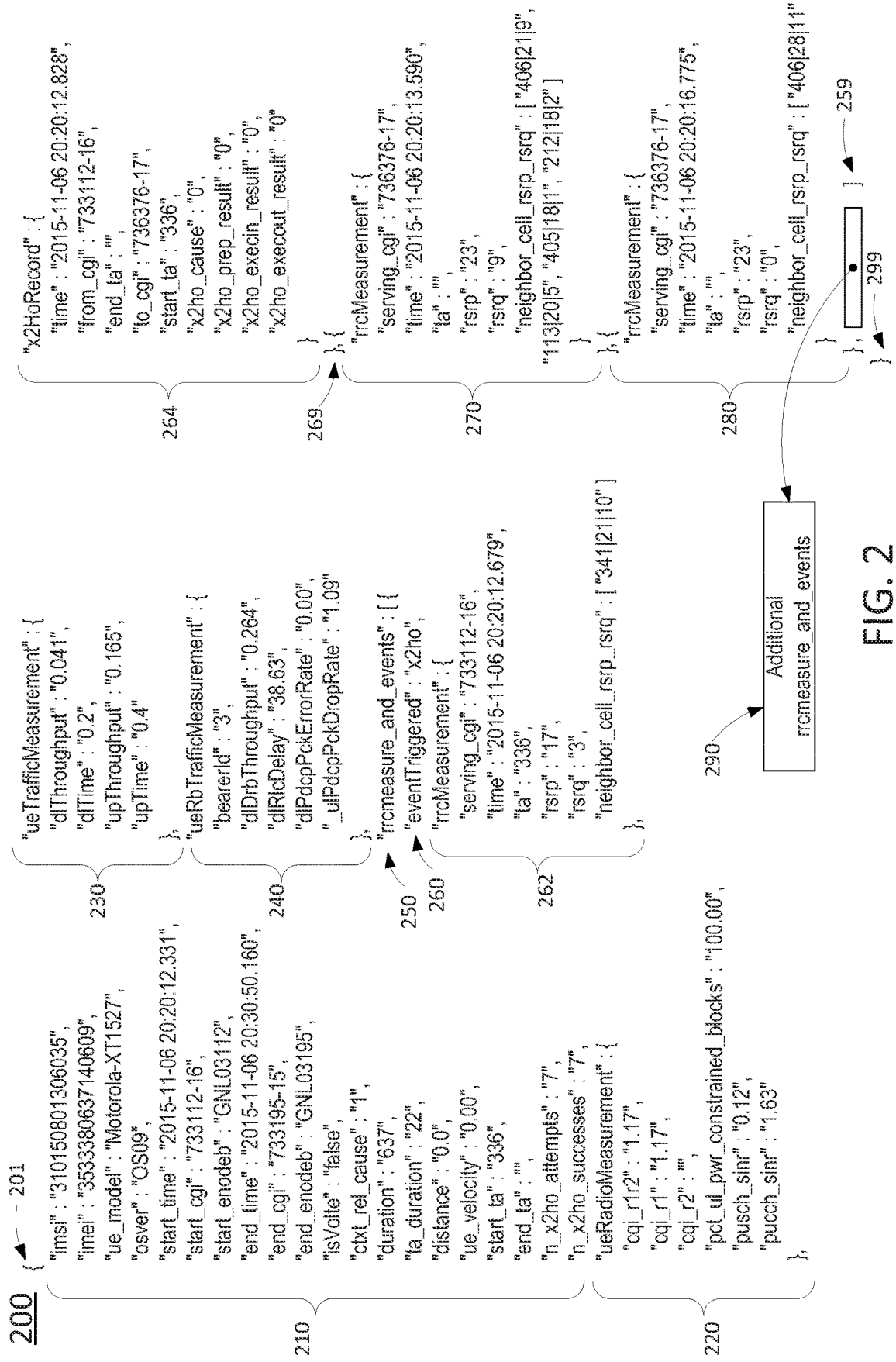
FIG. 2 illustrates an example session record, in accordance with the present disclosure.

As the AS 144 creates various session records, the session records may be stored in DB 145. In one example, the session records may be stored in a text-based format, such as Extensible Markup Language (XML) or Java Script Object Notation (JSON). In one example, DB 145 may have a similar structure and configuration as DB 143. For instance, the session records may still be stored in a key-value column-based database. However, in one example, DB 145 may utilize fewer physical resources as compared to DB 143, given that the data volume of the session records is significantly less than that of the data records stored in DB 143. In one example, AS 144 may also provide the session records to AS 146 for further processing in accordance with the present disclosure. Alternatively, or in addition, AS 146 may retrieve the session records from DB 145, e.g., using one or more access tools, such as those mentioned above. An example session record is illustrated in FIG. 2 and described in greater detail below.

Figure 3:
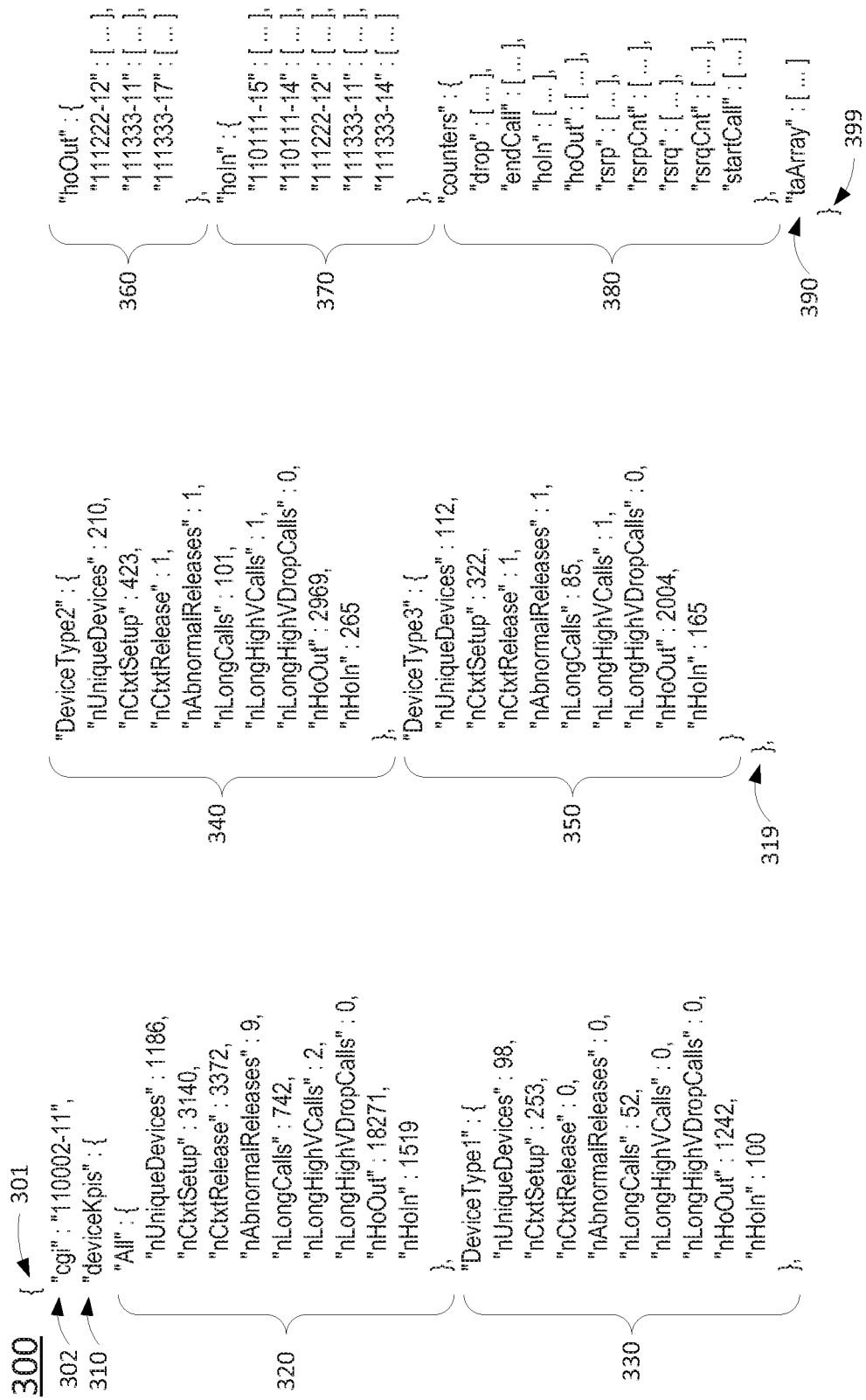
FIG. 3 illustrates an example cell-level record, in accordance with the present disclosure.

In accordance with the present disclosure, AS 146 may create cell-level records from the session records. For instance, AS 146 may retrieve session records from DB 145 relating to a given cell site by using a cell identifier, e.g., a cell global identifier (CG), as a key to the session records pertaining to the cell identifier. In one example, a cell-level record may include a number of key performance indicators (KPIs) relating to the functioning of a cell site. For instance, KPIs in a cell-level record may include: the number of endpoint devices of each of a plurality of endpoint device types that is serviced by the cell site, the number of session setups at the cell site for the endpoint devices of each of the plurality of endpoint device types, and the number of inter-cell handoffs at the cell site for the endpoint devices of each of the plurality of endpoint device type. Accordingly, in one example, to create a cell-level record, AS 146 may determine from multiple session records relating to the cell site: a number of endpoint devices of each of a plurality of endpoint device types that is serviced by the cell site, a number of session setups at the cell site for the endpoint devices of each of the plurality of endpoint device types, and/or a number of inter-cell handoffs at the cell site for the endpoint devices of each of the plurality of endpoint device types. In one example, AS 146 may further segregate the number of inter-cell handoffs at the cell site for the endpoint devices of each of the plurality of endpoint device types by a number of inter-cell handoffs into the cell site and a number of inter-cell handoffs out of the cell site. In one example, KPIs for a cell site that may be included in a cell-level record may further include: a number of abnormal session releases at the cell site for the endpoint devices of each of the plurality of endpoint device types, a number of long sessions at the cell site for the endpoint devices of each of the plurality of endpoint device types, and/or a number of long sessions with data volumes in excess of a threshold at the cell site for the endpoint devices of each of the plurality of endpoint device types. An example cell-level record is illustrated in FIG. 3 and described in greater detail below.

It should be noted that the system 100 has been simplified. In other words, the system 100 may be implemented in a different form than that which is illustrated in FIG. 1. For example, the system 100 may be expanded to include additional networks, such as network operations center (NOC) networks, additional eUTRANs, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, various elements of eUTRAN 120, EPC network 130, NOC network 140, and IMS core network 150 are omitted for clarity, including gateways or border elements providing connectivity between such networks, internal routers within EPC network 130, and so on. Similarly, due to the relatively large number of connections available between devices in the system 100, various links between MME 132, SGW 134, eNodeBs 121 and 122, collector 131, PDN GW 138, AS 142, AS 144, and AS 146, and other components of system 100 are also omitted for clarity.

In addition, although aspects of the present disclosure have been discussed above in the context of a long term evolution (LTE)-based network, examples of the present disclosure are not so limited. For example, the teachings of the present disclosure can be applied to other types of cellular networks (e.g., a 2G network, a 3G network, and the like, or a future technology or standard-based network). Similarly, although AS 142, AS 144, AS 146, DB 143, DB 145, and DB 147 are illustrated as components of NOC network 140, and collectors 131 are illustrated as components within EPC network 130, in other examples, any one or more of these components may be deployed in a different configuration. For example, one or more of collectors 131 may reside within NOC network 140 and may communicate with components in EPC network 130 via PDN GW 138, for example. In another example, the AS 142 and one or more of collectors 131 may be combined into a single component within EPC network 130 or in NOC network 140. Alternatively, or in addition, collectors 131 may pre-process operational data collected from various components, such as by grouping all operational data relating to a particular network element, a particular session, a particular cell site/eNodeB, etc., or by grouping operational data into blocks for a given time interval before sending the operational data to AS 142. In addition, although AS 142, AS 144, and AS 146 are illustrated and described as separate components to perform different functions in connection with creating session records and cell-level records of a cellular network, in another example, such functions may be performed by a single device. However, by spreading the functions among several application servers, the example hierarchical system for creating session records and cell-level records of a cellular network may more efficiently process the data records, session records, and cell-level records at the different levels of the hierarchy. For instance, operational data/data records may be processed on an ongoing basis, e.g., as the data records are generated, collected, and/or received, whereas the session records and/or the cell-level records may be created with less frequency, e.g., at the end of each session, once per hour, twice per day, weekly, or on some other basis. Thus, these and other modifications are all contemplated within the scope of the present disclosure.

FIG. 2 illustrates an example session record 200 in accordance with the present disclosure. In one example, raw data records comprising operational data, such as control/signaling messages from different network elements are in an un-structured or semi-structured format and are processed at a first level of a hierarchical system for creating session records and cell-level records of a cellular network. In one example, session records, such as the example session record 200, may be created at a second level of the hierarchical system based upon the data records created and/or stored at the first level. As illustrated in FIG. 2, the session record 200 may be associated with a single session of a user endpoint device. There may be many messages, and hence many data records associated with the session. Each data record may include information for a specific network control event such as a mobility cell handoff, a network measurement, and so forth. In one example, the session record 200 comprises a summary record based on all or a portion of the data records associated with the session. In addition complex KPIs are calculated from multiple data records associated with the session, where the KPIs that are calculated do not exist in any one of the data records.

In the example of FIG. 2, session record 200 is in a text-based format, e.g., a JSON format. In other examples, the session record 200 may be represented in XML, CSV, or a similar format. In one example, the session record 200 comprises a root object representing the session. The session record begins with the curly bracket at line 201 and then includes summary information regarding the session in section 210, such as the IMSI, IMEI, user equipment model number, call start and end locations, and so forth. Notably, section 210 includes the entry "ue_velocity" which indicates a velocity and/or speed of the user equipment during the session. Section 210 also includes the entries "n_x2ho_attempts" and "n_x2ho_successes" which indicate, with respect to the user equipment during the session, the number of inter-cell handoff attempts and the number of successful inter-cell handoffs, respectively. Following section 210 is sections 220, 230, and 240 (e.g., child JSON objects), which may include summary key performance indicators (KPIs) as experienced and/or recorded by the user equipment during the session. For example, section 220 may include radio measurements as recorded and experienced by the user equipment during the session, section 230 may include traffic measurements, such as downlink and uplink throughput for the session, while section 240 may include particular radio bearer (RB) traffic measurements. It should be noted that if there are multiple bearers allocated to a session, that there may be multiple sections/child objects similar to section 240 that are associated with the respective bearers.

Following section 240 is section 250 which includes various child JSON event objects for session control events, such as handoff events or network measurement events, and which extends from the start bracket following "rrcmeasure_and_events" to the end bracket on line 259. For example, section 250 may include section 260, e.g., a child object of section 250, which relates to an inter-cell handoff ("x2ho"). Section 260 itself includes two child objects: section 262 for "rrcMeasurement," e.g., a radio resource control measurement, and section 264 comprising parameters relating to the inter-cell handoff, such as a start time, an identifier of a starting eNodeB and an ending eNodeB ("from_cgi" and "to_cgi" respectively), a cause code identifying the reason for the inter-cell handoff, and so forth. In the example of FIG. 2, section 260 ends at line 269. Following section 260 is sections 270 and 280 which may comprise additional child objects of section 250, and which may store parameters relating to further radio resource control measurements.

It should be noted that for illustrative purposes, a portion 290 of the session record 200 is omitted from the example of FIG. 2. For example, portion 290 may include additional session control events, e.g., handoff events or network measurement events. In general, the total size of the session record 200, and the size of section 250 in particular, is dependent upon the number of child objects included in section 250. The number of child objects is dependent upon how long the session lasts, whether the user equipment is in motion (and thus, the number of inter-cell handoffs that occur during the session), and so forth. For instance, the entry in section 210 for "n_x2ho_successes" indicates that there was seven inter-cell handoffs for the session. Thus, it should be noted that there should be seven child objects within section 250 corresponding to the number of successful inter-cell handoffs. However, only section 260 corresponding to a first one of these events is illustrated in detail in FIG. 2. The session record 200 ends with curly bracket 299.

It should also be noted that at least a portion of the entries in session record 200 may be calculated from the data records upon which the session record 200 is based, where the information does not exist in any one of the data records. For example, the "distance" and "ue_velocity" in section 210 may correspond to a total distance traveled by the user equipment during the session and an average or peak velocity of the user equipment during the session. However, these values may not be discerned from any one data record, but may instead be calculated by comparing respective distance and bearing measurements that may be included in a plurality of the data records associated with the session.

To further aid in understanding the present disclosure, FIG. 3 illustrates an example cell-level record 300. As mentioned above, session records can further be aggregated to cell-level records at a next level within a hierarchical system for creating session records and cell-level records of a cellular network. A cell typically may have thousands of sessions on a daily basis. However, RAN engineers are typically not interested in each user session, but may have a greater need for statistics regarding overall cell performance. In accordance with the present disclosure, session records for a day, a week, a month, or some other time interval are thus aggregated into cell-level records, such as cell-level record 300. In one example, session level KPIs are weighted and averaged into cell-level KPIs. In addition, the cell-level KPIs may be distinguished by one or more particular device types.

As illustrated in FIG. 3, cell-level record 300 is in a text-based format, e.g., a JSON format. In other examples, the cell-level record 300 may be represented in XML, CSV, or a similar format. In one example, the cell-level record 300 comprises a root object representing the cell. The cell-level record 300 begins with the curly bracket at line 301 and then includes a "cell global identifier" ("cgi") at line 302, that uniquely identifies the eNodeB/cell associated with the cell-level record 300. Following line 302 is a first section 310, e.g., a child object for several device KPIs ("deviceKpis"). For example, section 310 includes several subsections, e.g., additional child objects, 320, 330, 340, and 350. Section 320 may include summary KPIs for all sessions in the cell labeled with the cell global identifier "110002-11" during the time interval for which the cell-level record 300 is created. Section 320 may include a total number of user equipment/endpoint devices ("nUniqueDevices"), a number of call setups and releases ("nCtxtSetup" and "nCtxtRelease"), a number of abnormal call releases ("nAbnormalReleases"), a number of inter-cell handoffs into the cell and out of the cell ("nHoIn" and "nHoOut"), and so forth. Section 330 may include the same summary KPIs, but with respect to the sessions associated with user equipment of a first device type ("DeviceType1"). Similarly, sections 340 and 350 may include the same summary KPIs with respect to the sessions associated with user equipment of a second device type ("DeviceType2") and a third device type ("DeviceType3"), respectively. The first section 310 ends with curly bracket 319.

Cell-level record 300 may further include section 360 which records information regarding inter-cell handoffs out of the cell, separated by the cell to which the sessions were transferred. In the present example, it appears that sessions associated with inter-cell handoffs out of the cell were transferred to three neighbor cells within the time period covered by the cell-level record 300, e.g., cells "111222-12," "111333-11," and "111333-17," respectively. Similarly, cell-level record 300 may include section 370 for inter-cell handoffs into the cell. In the present example, it appears that sessions associated with inter-cell handoffs into the cell were received from five neighbor cells within the time period covered by the cell-level record 300, e.g., cells "110111-15," "110111-14," "111222-12," "111333-11," and "111333-14," respectively. It should be noted that for illustrative purposes each line in sections 360 and 370 associated with a respective neighbor cell has been condensed within the brackets in the following form: "[ ]". In one example, the omitted information includes an array (or vector) of values corresponding to a number of handoff events occurring within a time block, of time block array (or vector) "taArray," in section 390. For example, the "taArray" of section 390 may comprise an array (or vector) of entries with values corresponding to time blocks within the time interval represented by the cell-level record 300. Due to the volume of entries within the "taArray" of section 390, the actual array entries have been omitted and are condensed in the following form: "[ ]".

Cell-level record 300 may further include section 380, which may include various counters regarding a number of dropped calls ("drop") a number of ended calls ("endCall") a total number of handoffs into the cell ("hoIn"), a total number of handoffs out of the cell ("hoOut"), and so forth. Each of the counters may comprise an array (or vector) having entries corresponding to a number of events occurring within one of the time blocks indicated by "taArray" of section 390. Again, due to the volume of entries within the various counters of section 380, the actual array entries have been omitted and are condensed in the following form: "[ . . . ]". The example cell-level record 300 ends with the curly bracket in line 399.

It should be noted that variations of the example session record 200 and cell-level record 300 may also be implemented in accordance with the present disclosure. For example, sections within session record 200 and/or cell level record 300 may be rearranged or may be combined in a different order than that which is illustrated in FIG. 2 or FIG. 3. In addition, various aspects of session record 200 and/or cell-level record 300 may be omitted in other examples of the present disclosure. For instance, in another example, a cell-level record may omit entries for a number of long high-volume dropped calls ("nLongHighVDropCalls"). In still another example, a cell-level record may break down the KPIs for a different number of specific device types. For instance, cell-level record 300 includes KPIs segregated for three specific device types, e.g., the three endpoint device types having the greatest number of unique devices that were served by the cell during the time period represented by the cell-level record 300. However, a different cell-level record may have device-type specific KPIs for the two most represented device types, for the four most represented device types, and so forth. Thus, various changes of a same or a similar nature may be implemented in accordance with the present disclosure.

Figure 4:
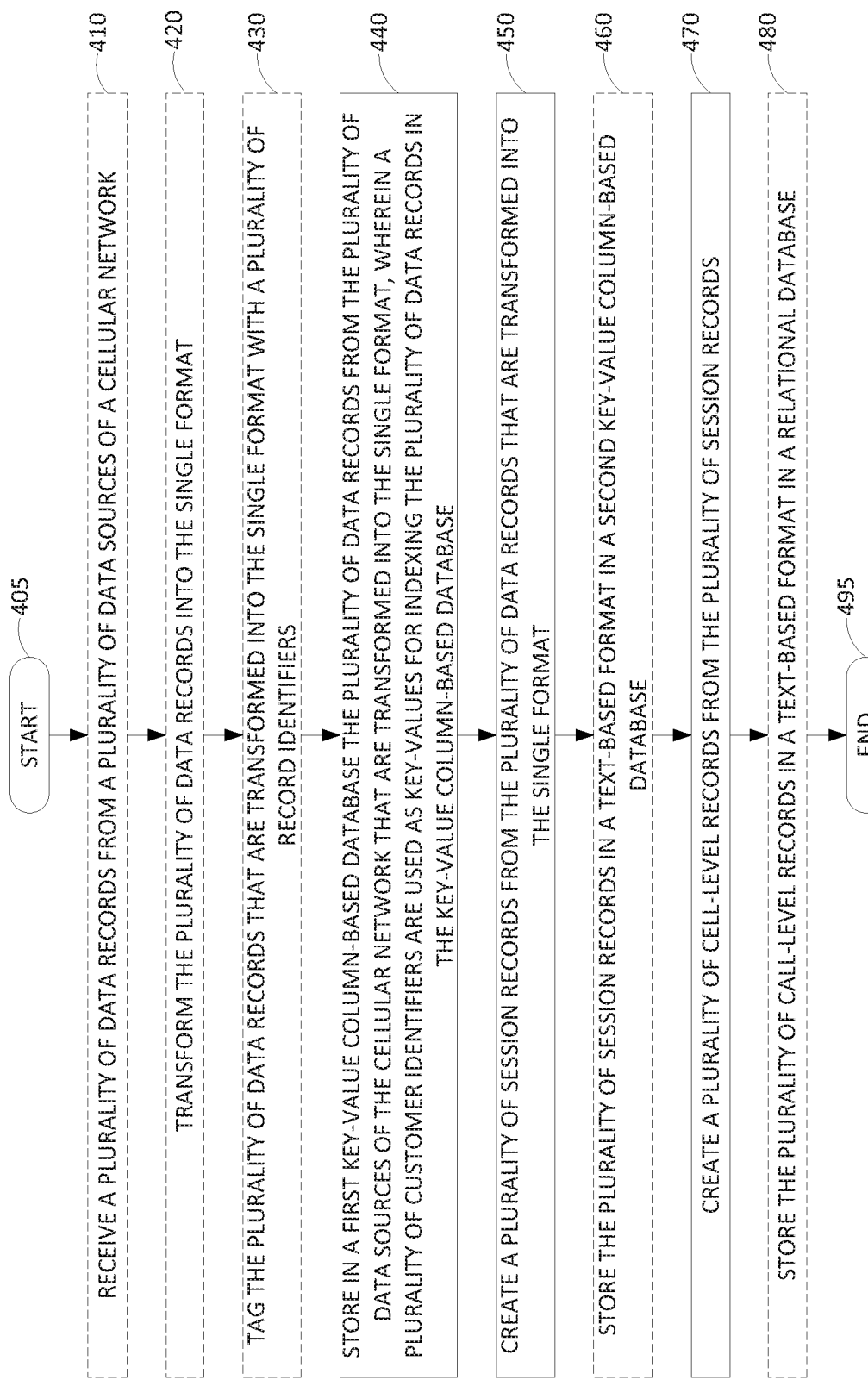
FIG. 4 illustrates a flowchart of an example method for creating session records and cell-level records of a cellular network.

FIG. 4 illustrates a flowchart of an example method 400 for creating session records and cell-level records of a cellular network, in accordance with the present disclosure. In one example, steps, functions and/or operations of the method 400 may be performed by a system comprising one or more network-based devices, such as application server (AS) 142, AS 144, and/or AS 146, or AS 142, AS 144, and/or AS 146 in conjunction with other components of the system 100, such as collectors 131 and collectors 151. In one example, the steps, functions, or operations of method 400 may be performed by a computing device or system 500, and/or processor 502 as described in connection with FIG. 5 below, or several processors represented by processor 502 in FIG. 5. For illustrative purposes, the method 400 is described in greater detail below in connection with an example performed by a plurality of processors, such as processor 502. The method 400 begins in step 405 and may proceed to optional step 410 or to step 440.

At optional step 410, a first processor may receive a plurality of data records from a plurality of data sources of a cellular network. For example, the first processor may receive operational data (e.g., data records) from collectors or other network elements within the cellular network.

At optional step 420, the first processor may transform the plurality of data records into a single format. In one example, the single format may comprise a text-based format, such as comma separated values (CSV), JSON, or XML.

At optional step 430, the first processor may tag the plurality of data records that are transformed into the single format with a plurality of record identifiers. For instance, the record identifiers may comprise numerical identifiers that uniquely identify each of the data records.

At step 440, the first processor stores, in a first key-value column-based database, the plurality of data records from the plurality of data sources of the cellular network that are transformed into the single format. In one example, the key-value column-based database and may be distributed over one or more physical storage devices. In one example, a plurality of customer identifiers such as a plurality of MSINs, IMSIs, or IMEIs, is used as key-values for indexing the plurality of data records in the first key-value column-based database.

At step 450, a second processor creates a plurality of session records from the plurality of data records that are transformed into the single format. In one example, each of the plurality of session records includes a velocity of an endpoint device associated with a session and a number of inter-cell handoff attempts for the session. In addition, in one example, each of the plurality of session records is labeled with a session identifier comprising a customer ID and a timestamp. The customer ID may be the same customer ID mentioned above, e.g., an MSIN, IMSI, IMEI, etc., and may relate to the endpoint device of the customer that is involved in the session. In one example, the timestamp for the session record may comprise the timestamp of the first data record relating to the session setup.

In one example, the first processor may forward to the second processor the plurality of data records that is transformed into the single format. Alternatively, or in addition, the second processor may access the first key-value column-based database to retrieve the data records stored therein, e.g., using one or more access tools mentioned above. In one example, the second processor may group the data records by session and derive various types of information for each session, which the second processor may then populate into the respective session records. In one example, the start of a session is identified by a data record relating to a first message sent out to set up the session, while the end of the session is identified by a data record relating to a second message sent to indicate that the endpoint device wants to disconnect, another data record indicating a dropped call or other abnormal termination, a data record relating to a message from another device that was party to the session indicating that the session should be torn down, and so forth. The data records with time stamps between the start and the end of the session are then aggregated.

In one example, the second processor may determine an endpoint device/user equipment velocity from data records that include distance values representing distances of the endpoint device to a cell site and data records that include bearing values representing bearings of the endpoint device with respect to the cell site. Similarly, the number of inter-cell handoffs for a session may be calculated by counting data records indicative of an inter-cell handoff. In one example, a session record may include sub-records for attempted, successful and/or unsuccessful inter-cell handoffs for the session. For example, sub-records for successful inter-cell handoffs for a session may include an identifier of a first cell site associated with the session, an identifier of an second cell site from which the session is transferred to the first cell site or to which the session is transferred from the first cell site, and a cause code that identifies a reason for the successful inter-cell handoff. In one example, a session record may also include sub-records comprising radio conditions at a plurality of time intervals during the session. In one example, each session record also identifies one or more cell sites that are associated with the session. An example session record 200 is illustrated in FIG. 2 and described in greater detail above. Following step 450, the method 400 may proceed to optional step 460 or to step 470.

At optional step 460, the second processor may store the plurality of session records in a text-based (e.g., a JSON or XML) format in a second key-value column-based database. In one example, the second key-value column-based database may have a similar structure and configuration as the first key-value column-based database, but may utilize fewer physical resources and comprise a smaller data volume as compared to the data records stored in the first key-value column-based database.

At step 470, a third processor creates a plurality of cell-level records from the plurality of session records. In one example, each of the plurality of cell-level records comprises a plurality of key performance indicators (KPIs) for a cell site of the cellular network segregated by a plurality of endpoint device types. For instance, the third processor may retrieve the session records from the second key-value column-based database, e.g., using one or more access tools, such as those mentioned above. For instance, the third processor may retrieve session records from the second key-value column-based database relating to a given cell site by using a cell identifier as a key to the session records pertaining to the cell identifier. Alternatively, or in addition, the second processor may provide the session record the third processor following step 450.

In one example, to create a cell-level record, the third processor may determine from multiple session records relating to the cell site: a number of endpoint devices of each of a plurality of endpoint device types that is serviced by the cell site, a number of session setups at the cell site for the endpoint devices of each of the plurality of endpoint device types, and/or a number of inter-cell handoffs at the cell site for the endpoint devices of each of the plurality of endpoint device types. The third processor may then record the values that are determined as KPIs for the cell-level record. In one example, the third processor may segregate the number of inter-cell handoffs at the cell site for the endpoint devices of each of the plurality of endpoint device types by a number of inter-cell handoffs into the cell site and a number of inter-cell handoffs out of the cell site. In one example, KPIs for a cell site that may be included in a cell-level record may further include: a number of abnormal session releases at the cell site for the endpoint devices of each of the plurality of endpoint device types, a number of long sessions at the cell site for the endpoint devices of each of the plurality of endpoint device types, and/or a number of long sessions with data volumes in excess of a threshold at the cell site for the endpoint devices of each of the plurality of endpoint device types. An example cell-level record is illustrated in FIG. 3 and described in greater detail above. Following step 470, the method 400 may proceed to optional step 480 or to step 495.

At optional step 480, the third processor may store the plurality of cell-level records in a text-based (e.g., JSON or XML) format in a relational database. For instance, the cell-level records may comprise a relatively fewer number of records and a smaller data volume as compared to the session records and data records stored in the first and second key-value column-based databases, respectively. For instance, the cell-level records may utilize up to 98% less storage capacity, e.g., in terms of a number of physical resources and/or an overall data volume. Thus, the cell-level records may be stored in a manageable way in a relational database system. Following optional step 480, the method 400 may proceed to step 495. At step 495, the method 400 ends.

In addition, it should be noted that although not specifically specified, one or more steps, functions or operations of the method 400 may include a storing, displaying and/or outputting step as required for a particular application. In other words, any data, records, fields, and/or intermediate results discussed in the method 400 can be stored, displayed and/or outputted to another device as required for a particular application. Furthermore, steps or blocks in FIG. 4 that recite a determining operation or involve a decision do not necessarily require that both branches of the determining operation be practiced. In other words, one of the branches of the determining operation can be deemed as an optional step. It should be noted that the method 400 may be expanded to include additional steps. In addition, one or more steps, blocks, functions, or operations of the above described method 400 may comprise optional steps, or can be combined, separated, and/or performed in a different order from that described above, without departing from the example embodiments of the present disclosure.

As such, the present disclosure provides at least one advancement in the technical field of cellular network operational data collection and storage. For instance, examples of the present disclosure include devices and systems that increase the storage efficiency and the utility of operational data collected in a cellular network. In particular, examples of the present disclosure include a hierarchical system to collect, normalize/transform, tag, and store/archive operational data/data records in a more efficient manner. In accordance with the present disclosure, a hierarchical system may further create session records and cell-level records of the cellular network, as described herein. For instance, the session records and cell-level records, as stored, may utilize less resources, e.g., less memory or less storage volume as compared to the operational data/data records, and may therefore provide information that is more useful to personnel interested in a higher level view of the cellular network. However, at the same time, the operational data/data records may be collected, processed and stored in near-real time to provide more immediately useful information to network personnel or to other automated systems of the network. In addition, examples of the present disclosure improve the functioning of a computing device or a network of computing devices, e.g., a server or a system comprising a plurality of servers. Namely, servers dedicated to processing and storing cellular network operational data are improved in the examples of the present disclosure, such as the hierarchical system to create session records and cell-level records of a cellular network, as described herein.

Figure 5:
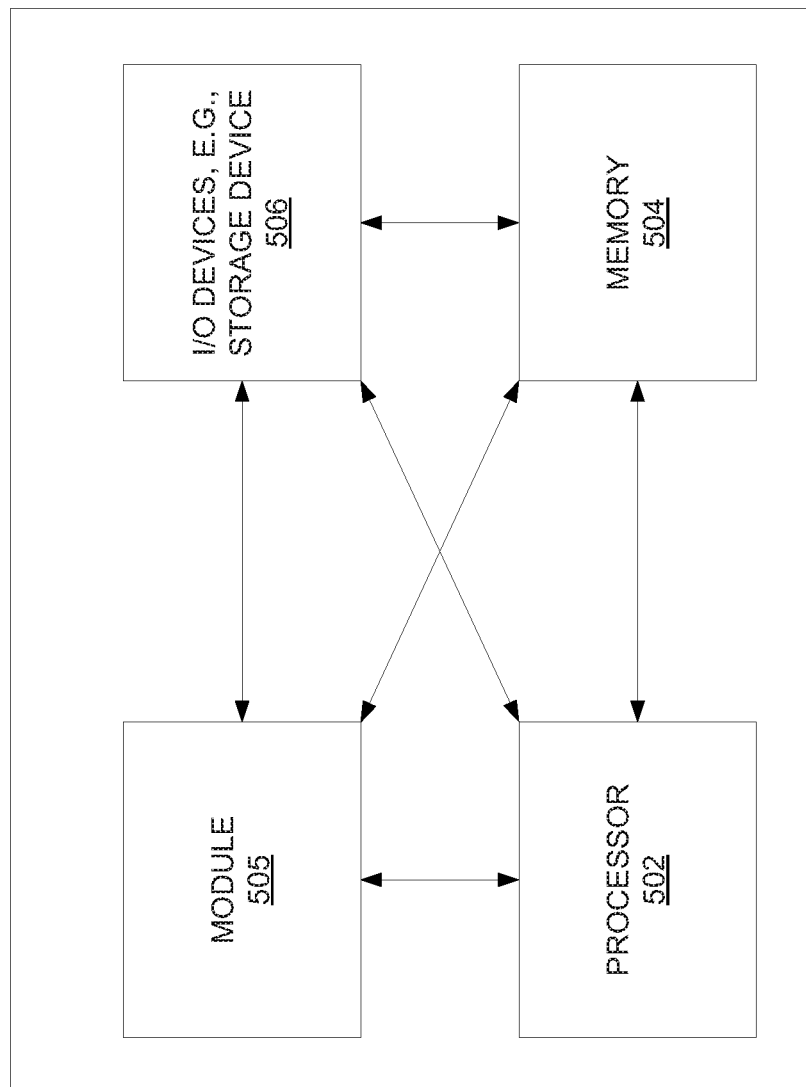
FIG. 5 illustrates an example high-level block diagram of a computer specifically programmed to perform the steps, functions, blocks, and/or operations described herein.

FIG. 5 depicts a high-level block diagram of a computing device suitable for use in performing the functions described herein. As depicted in FIG. 5, the system 500 comprises one or more hardware processor elements 502 (e.g., a central processing unit (CPU), a microprocessor, or a multi-core processor), a memory 504 (e.g., random access memory (RAM) and/or read only memory (ROM)), a module 505 for creating session records and cell-level records of a cellular network, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 400 as discussed above is implemented in a distributed or parallel manner for a particular illustrative example, i.e., the steps of the above method 400, or the entire method 400 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 400. In one embodiment, instructions and data for the present module or process 505 for creating session records and cell-level records of a cellular network (e.g., a software program comprising computer-executable instructions) can be loaded into memory 504 and executed by hardware processor element 502 to implement the steps, functions or operations as discussed above in connection with the illustrative method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 505 for creating session records and cell-level records of a cellular network (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A system comprising:
   a first hardware processor for storing, in a first key-value column-based database, a plurality of data records from a plurality of data sources of a cellular network, the plurality of data records transformed into a single format, wherein a plurality of customer identifiers is used as key-values for indexing the plurality of data records in the first key-value column-based database, wherein at least two of the plurality of data records include:
  distance values representing distances of an endpoint device to a cell site; and
  bearing values representing bearings of the endpoint device with respect to the cell site;
a second hardware processor for creating a plurality of session records from the plurality of data records that is transformed into the single format, wherein at least a first session record of the plurality of session records includes a velocity of the endpoint device associated with a first session of a plurality of sessions, wherein the velocity of the endpoint device is calculated from the distance values and the bearing values, and wherein each of the plurality of session records is labeled with a session identifier comprising a customer identifier of the plurality of customer identifiers and a timestamp; and
a third hardware processor for creating a plurality of cell-level records from the plurality of session records, wherein at least a first cell-level record of the plurality of cell-level records comprises a plurality of key performance indicators for the cell site of the cellular network segregated by a plurality of endpoint device types, wherein the third hardware processor is further for storing the plurality of cell-level records, the plurality of cell-level records comprising a fewer number of records and a smaller data volume as compared to a number of records and a data volume of the plurality of data records and the plurality of session records.

2. The system of claim 1, wherein the first hardware processor is further for:
  receiving the plurality of data records from the plurality of data sources of the cellular network;
  transforming the plurality of data records into the single format; and
  tagging the plurality of data records that is transformed into the single format with a plurality of record identifiers.

3. The system of claim 1, wherein each customer identifier comprises at least one of: a mobile subscription identification number, an international mobile subscriber identity, or an international mobile equipment identity.

4. The system of claim 1, wherein the timestamp is extracted from one of the plurality of data records which indicates a start time of a respective session of the plurality of sessions.

5. The system of claim 1, wherein the single format comprises a text-based format.

6. The system of claim 5, wherein the text-based format comprises a comma separated value format.

7. The system of claim 1, wherein each of the plurality of session records includes:
  a start time and an end time for a respective session of the plurality of sessions.

8. The system of claim 1, wherein each of the plurality of session records further includes:
  a first plurality of sub-records for each of a plurality of successful inter-cell handoffs for a respective session of the plurality of sessions; and
  a second plurality of sub-records comprising radio conditions at a plurality of time intervals during the respective session.

9. The system of claim 8, wherein each of the first plurality of sub-records for each of the plurality of successful inter-cell handoffs for the respective session of the plurality of sessions includes:
  an identifier of a first cell site associated with the respective session;
  an identifier of a second cell site from which the respective session is transferred to the first cell site or to which the respective session is transferred from the first cell site; and
  a cause code that identifies a reason for the successful inter-cell handoff.

10. The system of claim 1, wherein the creating the plurality of cell-level records comprises, for each of the plurality of cell-level records:
  determining, from the plurality of session records, a number of endpoint devices of each of the plurality of endpoint device types that is serviced by a respective cell site of a plurality of cell sites.

11. The system of claim 10, wherein the creating the plurality of cell-level records further comprises, for each of the plurality of cell-level records:
  determining, from the plurality of session records, a number of session setups at the respective cell site for the endpoint devices of each of the plurality of endpoint device types; and
  determining, from the plurality of session records, a number of inter-cell handoffs at the respective cell site for the endpoint devices of each of the plurality of endpoint device types.

12. The system of claim 11, wherein the number of inter-cell handoffs at the respective cell site for the endpoint devices of each of the plurality of endpoint device types is segregated by a number of inter-cell handoffs into the respective cell site and a number of inter-cell handoffs out of the respective cell site.

13. The system of claim 11, wherein the plurality of key performance indicators for each of the plurality of cell-level records includes the number of the endpoint devices of each of the plurality of endpoint device types that is serviced by the respective cell site, the number of session setups at the respective cell site for the endpoint devices of each of the plurality of endpoint device types, and the number of inter-cell handoffs at the respective cell site for the endpoint devices of each of the plurality of endpoint device types.

14. The system of claim 13, wherein for each of the plurality of cell-level records, the plurality of key performance indicators further includes, for each of the plurality of endpoint device types:
  a number of abnormal session releases at the respective cell site for the endpoint devices of each of the plurality of endpoint device types; or
  a number of long sessions at the respective cell site for the endpoint devices of each of the plurality of endpoint device types.

15. The system of claim 1, wherein the second hardware processor is further for storing the plurality of session records in a text-based format in a second key-value column-based database.

16. The system of claim 1, wherein the third hardware processor is further for storing the plurality of cell-level records in a text-based format in a relational database.

17. A non-transitory computer-readable medium storing instructions which, when executed by a plurality of processors in a network, cause the plurality of processors to perform operations, the operations comprising:

storing, in a first key-value column-based database, a plurality of data records from a plurality of data sources of a cellular network, the plurality of data records transformed into a single format, wherein a plurality of customer identifiers is used as key-values for indexing the plurality of data records in the first key-value column-based database, wherein at least two of the plurality of data records include:
  distance values representing distances of an endpoint device to a cell site; and
  bearing values representing bearings of the endpoint device with respect to the cell site;
creating a plurality of session records from the plurality of data records that is transformed into the single format, wherein at least a first session record of the plurality of session records includes a velocity of the endpoint device associated with a first session of a plurality of sessions, wherein the velocity of the endpoint device is calculated from the distance values and the bearing values, and wherein each of the plurality of session records is labeled with a session identifier comprising a customer identifier of the plurality of customer identifiers and a timestamp; and
creating and storing a plurality of cell-level records from the plurality of session records, wherein at least a first cell-level record of the plurality of cell-level records comprises a plurality of key performance indicators for the cell site of the cellular network segregated by a plurality of endpoint device types, wherein the plurality of cell-level records comprises a fewer number of records and a smaller data volume as compared to a number of records and a data volume of the plurality of data records and the plurality of session records.

18. A method, comprising:
storing, by a first processor, in a first key-value column-based database, a plurality of data records from a plurality of data sources of a cellular network, the plurality of data records transformed into a single format, wherein a plurality of customer identifiers is used as key-values for indexing the plurality of data records in the first key-value column-based database, wherein at least two of the plurality of data records include:
  distance values representing distances of an endpoint device to a cell site; and
  bearing values representing bearings of the endpoint device with respect to the cell site;
creating, by a second processor, a plurality of session records from the plurality of data records that is transformed into the single format, wherein at least a first session record of the plurality of session records includes a velocity of the endpoint device associated with a first session of a plurality of sessions, wherein the velocity of the endpoint device is calculated from the distance values and the bearing values, and wherein each of the plurality of session records is labeled with a session identifier comprising a customer identifier of the plurality of customer identifiers and a timestamp; and
creating, by a third processor, a plurality of cell-level records from the plurality of session records, wherein at least a first cell-level record of the plurality of cell-level records comprises a plurality of key performance indicators for the cell site of the cellular network segregated by a plurality of endpoint device types, wherein the third processor is further for storing the plurality of cell-level records, the plurality of cell-level records comprising a fewer number of records and a smaller data volume as compared to a number of records and a data volume of the plurality of data records and the plurality of session records.

19. The method of claim 18, wherein each customer identifier comprises at least one of: a mobile subscription identification number, an international mobile subscriber identity, or an international mobile equipment identity.

20. The method of claim 18, wherein the timestamp is extracted from one of the plurality of data records which indicates a start time of a respective session of the plurality of sessions.

* * * * *